Figure 1:
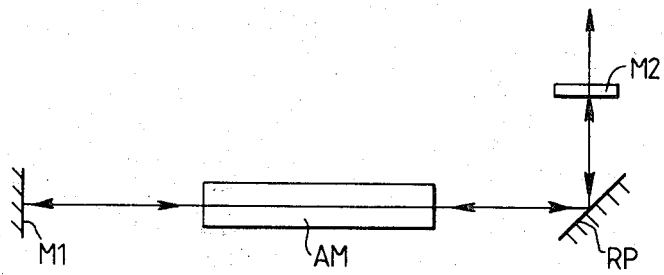

United States Patent [19]

Hamilton et al.

[11] 4,340,969
[45] Jul. 20, 1982

[54] LASER APPARATUS

[75] Inventors: David C. Hamilton, Cottingham, England; Kenneth S. Lipton, Edinburgh, Scotland

[73] Assignee: Ferranti Limited, Cheadle, England

[21] Appl. No.: 154,858

[22] Filed: May 30, 1980

[30] Foreign Application Priority Data

Jun. 2, 1979 [GB] United Kingdom ............... 7919306

[51] Int. Cl.³ .................... H01S 3/081; H01S 3/08
[52] U.S. Cl. ...................................... 372/93; 372/99; 372/106
[58] Field of Search ............ 331/94.5 C, 94.5 D, 331/94.5 Q, 94.5 M

[56] References Cited

U.S. PATENT DOCUMENTS 3,496,483 2/1970 Max et al. ................. 331/94.5 C
4,292,602 9/1981 Bergquist ................. 331/94.5 C Primary Examiner—William L. Sikes
Attorney, Agent, or Firm—Kerkam, Stowell, Kondracki & Clarke

[57] ABSTRACT

Laser apparatus operable in the range 8 to 50 microns, has an optical cavity defined by two mirrors M1 and M2, one of which is partially transmitting. The cavity contains a laser active medium AM and a reflecting polarizer RP. The reflecting polarizer comprises a substrate carrying a metallic reflecting coating covered by a dielectric layer of alumina, silicon dioxide or magnesium oxide. The wavelength of operation determines the dielectric material to be used, and the thickness of the layer determines the absorption loss introduced into one of two perpendicular planes of polarization.

7 Claims, 2 Drawing Figures

LASER APPARATUS

This invention relates to laser apparatus, and in particular to a reflective polariser for use in a laser cavity.

There are many applications in which a laser is required to emit linearly polarised radiation, and to achieve this it is necessary to include some form of polariser in the optical cavity of the laser.

Suitable polarisers may take several forms. It is, for example, possible to use a diffraction grating. The diffraction efficiencies are different for the two orthogonal planes of polarisation, resulting in the laser oscillating in the plane having the lower loss. Disadvantages of this method are that the grating may be damaged easily, by rough handling or excessive laser power, and the insertion loss may be significant.

Another form of polariser is the Brewster window. This is a plate of a suitable material positioned within the optical cavity at the Brewster angle with respect to the optical axis of the laser. The plate preferentially transmits radiation having one plane of polarisation, resulting in laser oscillation in that plane. Often the Brewster window may fulfil some other purpose as well, such as forming part of the envelope containing a gaseous active medium. Disadvantages may include a high insertion loss, because of bulk absorption by the plate material, and an undesirable space wastage since the plate must be inserted at a fairly large angle to the optical axis, typically around 70°.

It is a characteristic of a laser that if significantly more of the radiation in one of two perpendicular planes is absorbed, than of the radiation in the other plane, then the laser will oscillate in only the one plane of polarisation. That is, the differential loss between the two perpendicular planes must be such that laser action in one plane is prevented. This typically requires a differential loss of the order of 20% in small volume gas lasers.

It is frequently desirable or advantageous to provide a reflecting surface within a laser cavity, for folding or other purposes, and it is an object of the invention to provide a reflecting polariser for laser apparatus.

According to the present invention there is provided laser apparatus operable at a wavelength in the range 8 to 50 microns, which includes within its optical cavity a reflector positioned at an insertion angle in the range 20° to 70° and comprising a substrate carrying a metallic reflecting coating over which is formed a layer of dielectric material of a composition and thickness such that at the wavelength of operation the differential absorption between radiation polarised in two perpendicular planes prevents laser operation in one of the two planes.

If the laser is to operate at a wavelength in the range 8 to 12 microns then the dielectric material is preferably alumina.

If the laser is to operate at a wavelength in the range 12 to 50 microns then the dielectric material may be silicon dioxide or magnesium oxide.

Preferably the insertion angle of the reflecting surface is of the order of 45°.

The invention will now be described with reference to the accompanying drawings, in which:-

Figure 2:
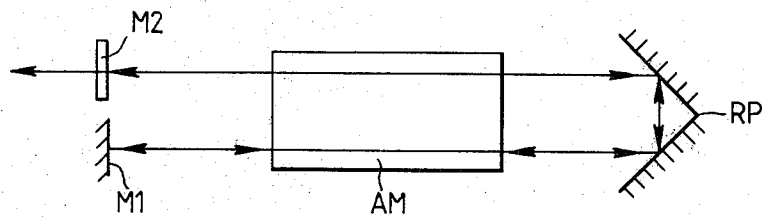

FIG. 1 is a schematic diagram of one form of laser according to the invention; and FIG. 2 is a schematic diagram of an alternative construction.

Referring now to FIG. 1, a laser comprises an optical cavity defined by two end mirrors M1 and M2, mirror M1 being nominally 100% reflecting and mirror M2 being partially reflecting. Between these mirrors is the laser active medium AM, together with some means for pumping the active medium (not shown). If the active medium is a solid medium, then the pumping means will probably be a bright light source, whereas a gaseous active medium may be excited by an electric discharge. As shown in FIG. 1 the optical cavity of the laser also includes the reflecting polariser RP. This is shown, at an insertion angle of 45°, that is with its reflecting face at 45° to the incident, and reflected, radiation. This has the effect of introducing a 90° bend in the optical axis of the laser.

The reflecting polariser RP is made up on a suitable substrate, say of metal, glass or ceramic, on which is deposited a metallic reflecting layer. Such layer may conveniently be formed of silver, gold or aluminium. This reflecting layer is itself covered by a dielectric layer of alumina ($Al_2O_3$), silicon dioxide ($SiO_2$) or magnesium oxide (MgO). The thickness of the layer determines the losses for the P-plane polarisation, whilst the losses in the S-plane remain virtually unaffected. The thickness of the dielectric layer is arranged to be such that the differential loss between the two planes is typically 20%. To achieve this, then a typical alumina layer would have a thickness of between 1000Å and 4000Å. The optimum thickness also depends upon the wavelength of the radiation which may be between 8 and 50 microns. The differential loss is also affected by the insertion angle of the reflecting polariser, and this angle may be varied between, say, 20° and 70° to give the desired loss.

The reflecting polariser introduces less overall loss to that radiation which oscillates in the selected plane of polarisation than does the diffraction grating, and in many cases, the Brewster plate. This may be of considerable importance in short length or low gain lasers. In addition, it is more robust and/or cheaper than the Brewster plate or the diffraction grating.

Since the reflecting polariser essentially introduces a bend into the optical axis of the laser, it is of particular use in the folded laser, where an intentional 180° bend is introduced. FIG. 2 shows such a laser. The various elements of the laser are exactly as described with reference to FIG. 1, except that the reflecting polariser RP now comprises two mirrors at 90° to one another. Since the reflecting polariser is formed by two mirrors, each need not produce more than about 10% differential loss, and hence the dielectric layers may be thinner. Alternatively a combination of one polarising mirror and one conventional plane mirror may be used.

Using the reflecting polariser described above, a very compact laser may be produced, particularly in the case of a folded laser which requires no more optical elements than a conventional basic folded laser. The two reflecting surfaces may be arranged as roof top reflector to give the stability benefits associated with that type of reflector.

What we claim is:

1. Laser apparatus having an optical cavity operable at a wavelength in the range 8 to 50 microns, which includes within its optical cavity a reflector positioned at an insertion angle in the range 20° to 70° and comprising a substrate carrying a metallic reflecting coating over which is formed a layer of dielectric material of a composition and thickness such that at the wavelength of operation the differential absorption between radiation polarised in two perpendicular planes prevents laser operation in one of the two planes.

2. Apparatus as claimed in claim 1 in which the metallic reflecting coating is made from one of the materials in the group comprising gold, silver and aluminium.

3. Apparatus as claimed in either of claims 1 or 2 in which the laser apparatus is intended for operation at a wavelength in the range 8 to 12 microns and in which the dielectric material is alumina.

4. Apparatus as claimed in either of claims 1 or 2 in which the laser apparatus is intended for operation at a wavelength in the range 12 to 50 microns and in which the dielectric material is one of the materials in the group comprising silicon dioxide and magnesium oxide.

5. Apparatus as claimed in claim 1 in which the thickness of the dielectric layer is in the range of 1000Å to 4000Å.

6. Apparatus as claimed in claim 1 in which the insertion angle of the reflector is 45°.

7. Apparatus as claimed in claim 1 in which the reflector comprises two surfaces arranged at 90° to one another such that the optical axis of the laser is folded through 180° with one of said two surfaces being positioned at said insertion angle.

* * * * *